May 5, 1936.   E. A. SLYE   2,040,025
PREDETERMINED COUNT MECHANISM
Original Filed July 17, 1929   6 Sheets-Sheet 3
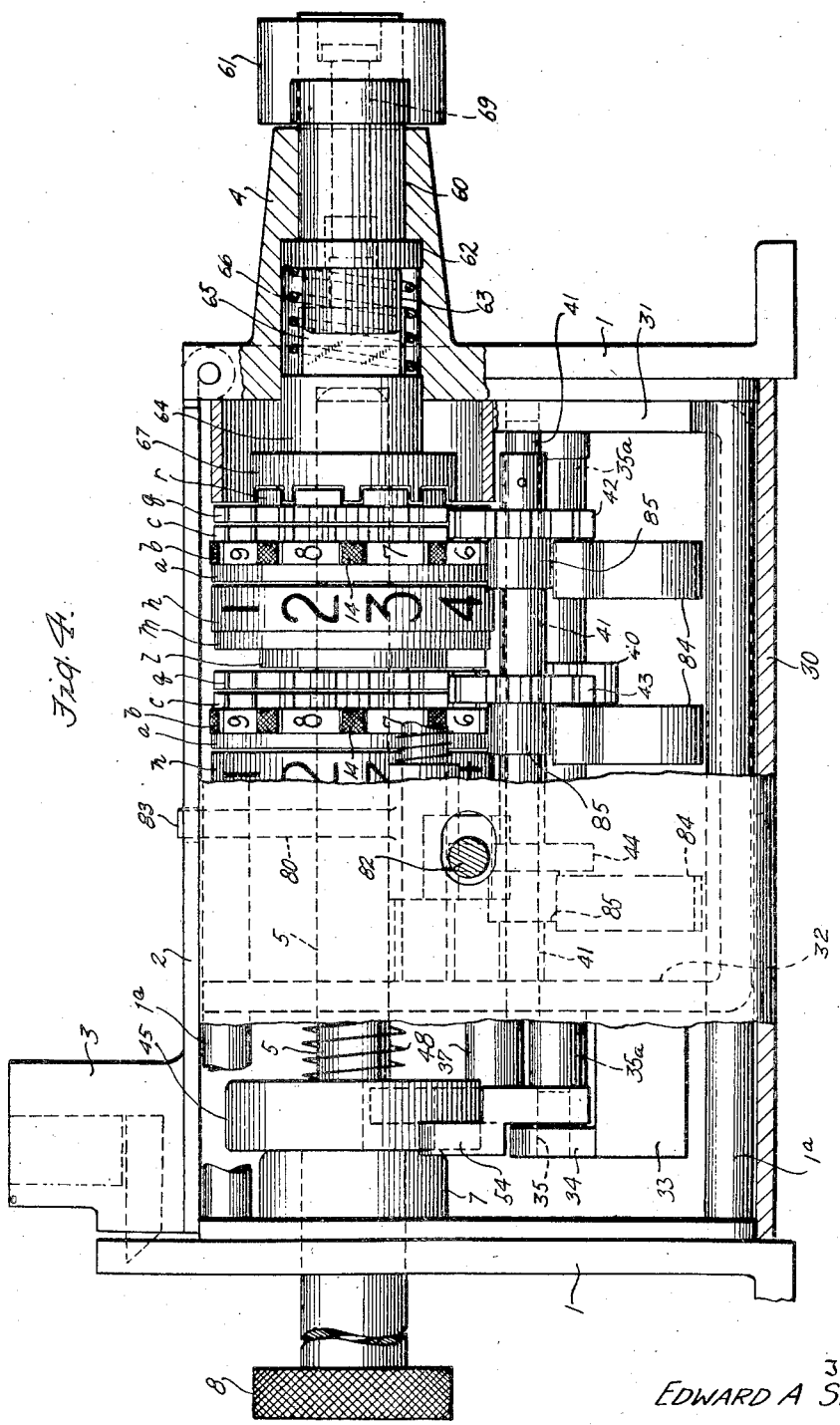
Inventor
EDWARD A SLYE
Geo. M. Dour
Attorney May 5, 1936.   E. A. SLYE   2,040,025
PREDETERMINED COUNT MECHANISM
Original Filed July 17, 1929   6 Sheets-Sheet 4
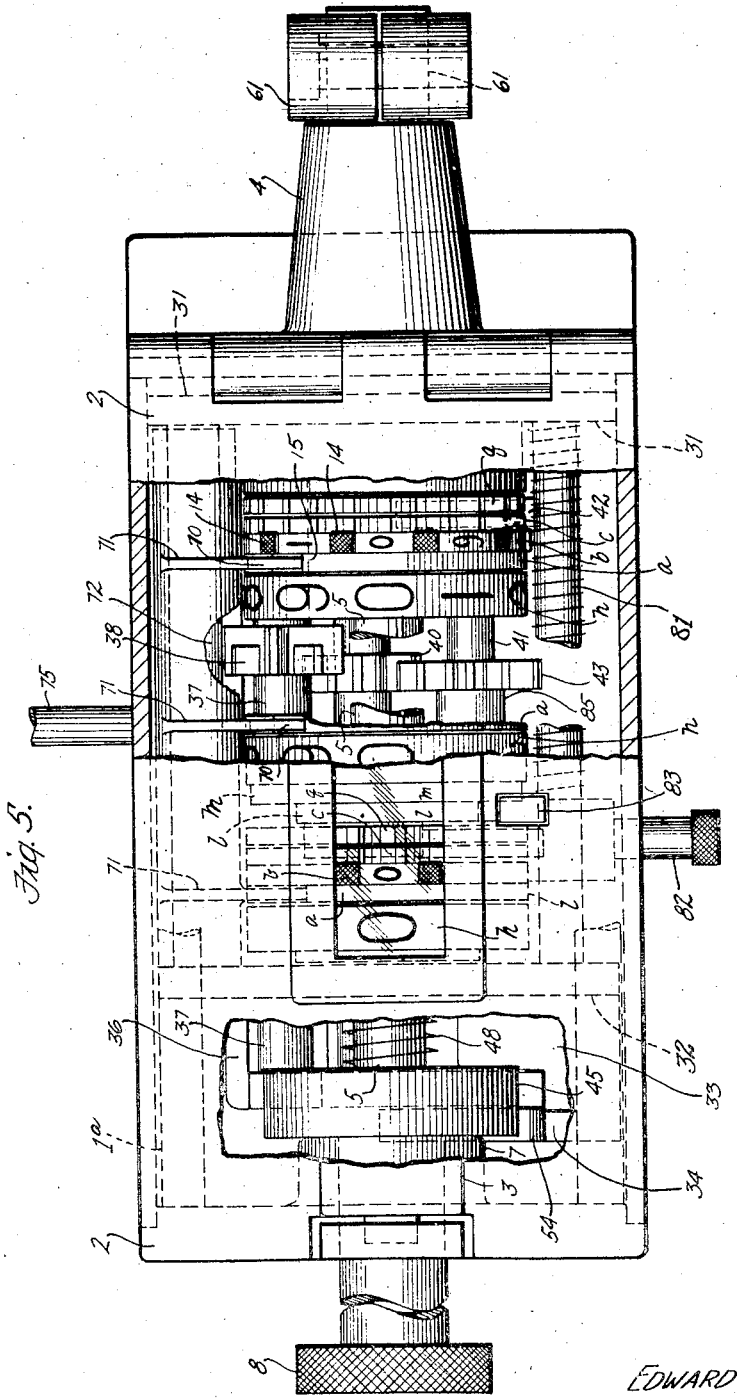
Inventor
EDWARD A. SLYE
Geo. M. Dowe
Attorney May 5, 1936.　　　　　E. A. SLYE　　　　　2,040,025
PREDETERMINED COUNT MECHANISM Original Filed July 17, 1929　　6 Sheets-Sheet 5

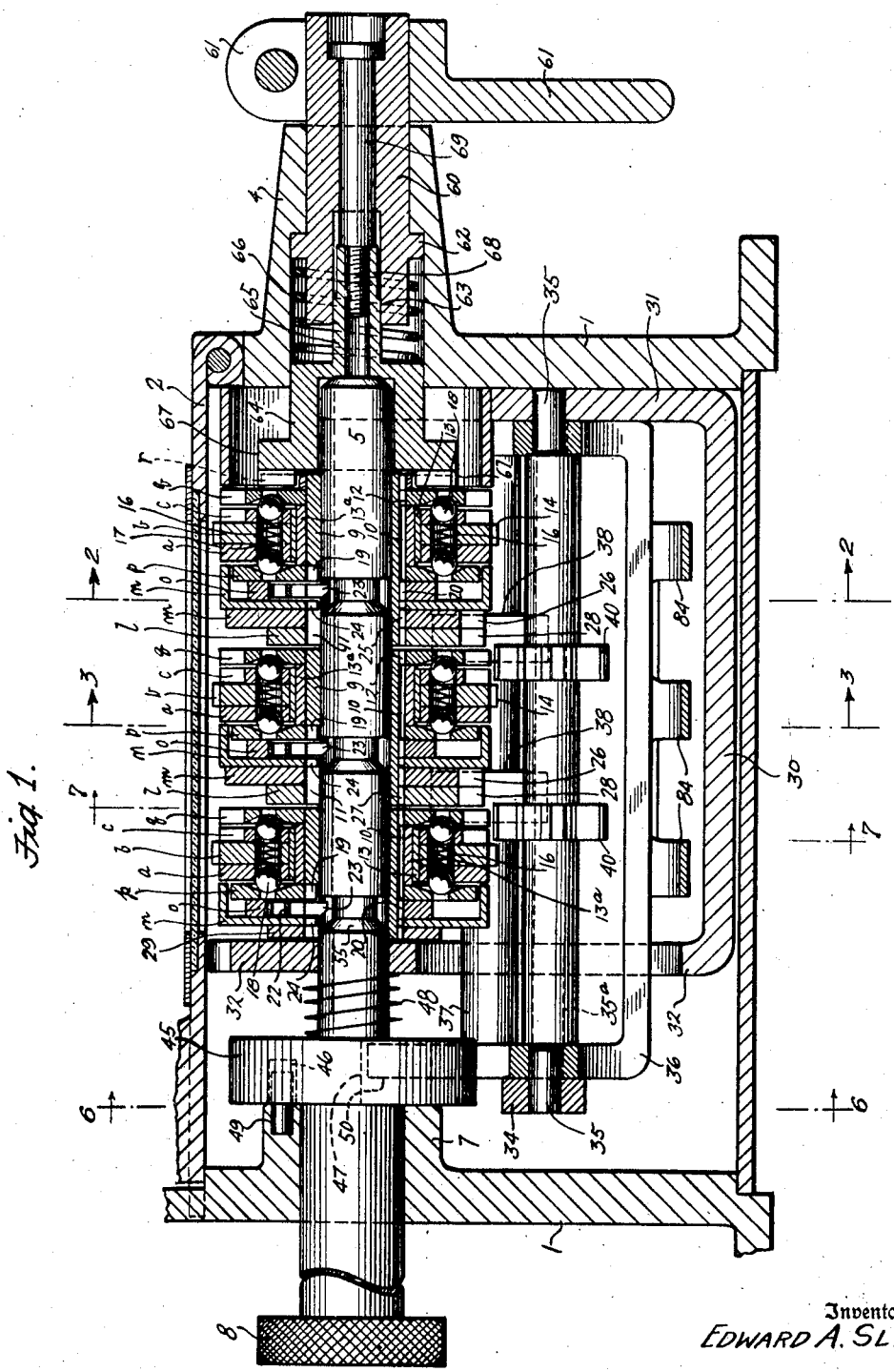

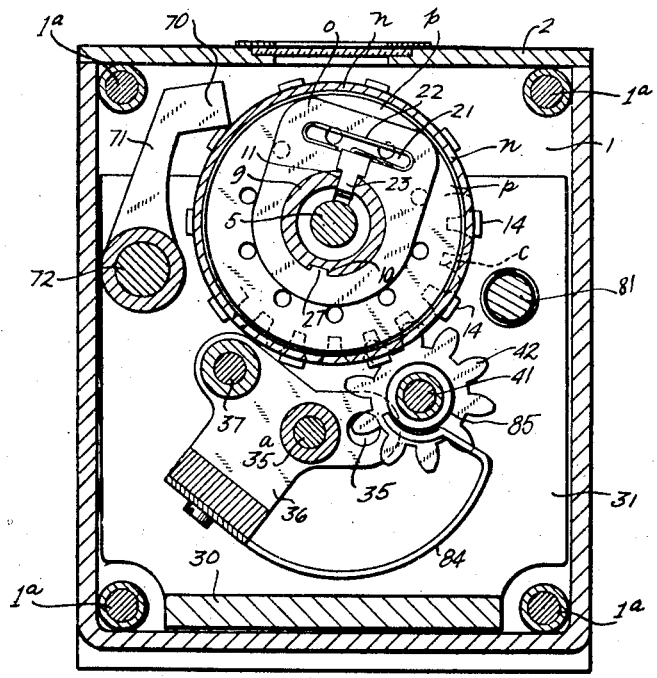

Inventor
EDWARD A. SLYE
Attorney

May 5, 1936.  E. A. SLYE  2,040,025
PREDETERMINED COUNT MECHANISM
Original Filed July 17, 1929    6 Sheets—Sheet 6
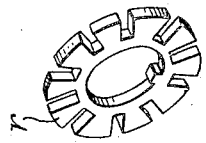
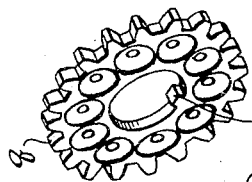
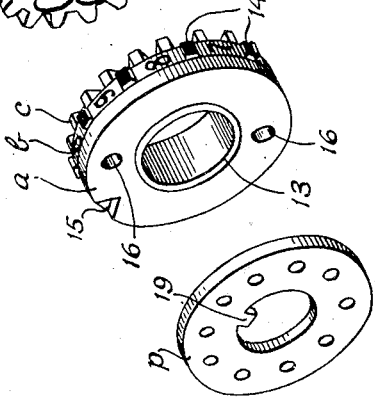
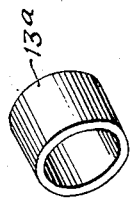
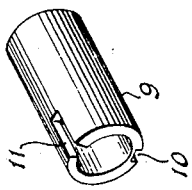
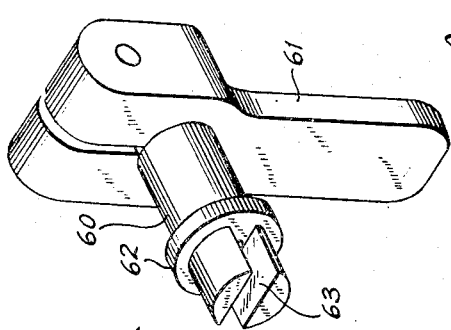
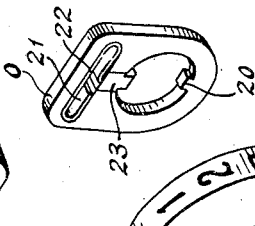
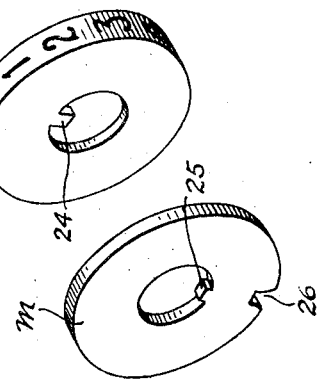
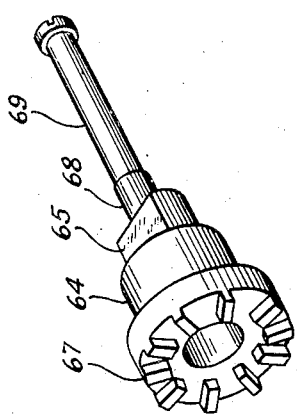
Inventor
EDWARD A. SLYE
Attorney Patented May 5, 1936

2,040,025

UNITED STATES PATENT OFFICE 2,040,025

PREDETERMINED COUNT MECHANISM

Edward A. Slye, Burnside, Conn., assignor to Veeder-Root Incorporated, Hartford, Conn., a corporation of Connecticut Original application July 17, 1929, Serial No. 378,831. Divided and this application August 10, 1934, Serial No. 739,217

26 Claims. (Cl. 235—132)

This invention relates to counters and more particularly to a predetermined count mechanism therefor.

The present application is a division of my application Serial No. 378,831, filed July 17, 1929 and issued as Patent No. 1,980,232, November 13, 1934.

The invention set forth in said parent application is a so-called "locked" counter in which the counting wheels may be rotated in either direction with provision for unlocking the counter during resetting and the present divisional case relates to the combination with such a counter of mechanism whereby a predetermined count may be indicated.

A feature of the present invention relates to the novel construction of the predetermined count wheels and their relation to the counting wheels.

A further feature relates to aligning means for the predetermined count wheels and the transfer pinions whereby both are aligned by the same mechanism.

In the drawings:

Figure 1 is a longitudinal section through a counter;

Figure 2 is a section on the line 2—2, Figure 1;

Figure 3 is a section on the line 3—3, Figure 1;

Figure 4 is an elevation of the counter with some of the casing broken away;

Figure 5 is a top view with parts broken away and some of the counter elements removed;

Figure 8 is a detail perspective showing some of the elements of a counting unit separated;

Figure 9 is a perspective view of one of the supporting sleeves for the counter units;

Figure 10 is a perspective view of one of the supporting sleeves for the predetermined count wheels, and Figure 11 is a perspective view showing the connection between the driving mechanism and the counter unit of lowest order.

Figures 6, 7:
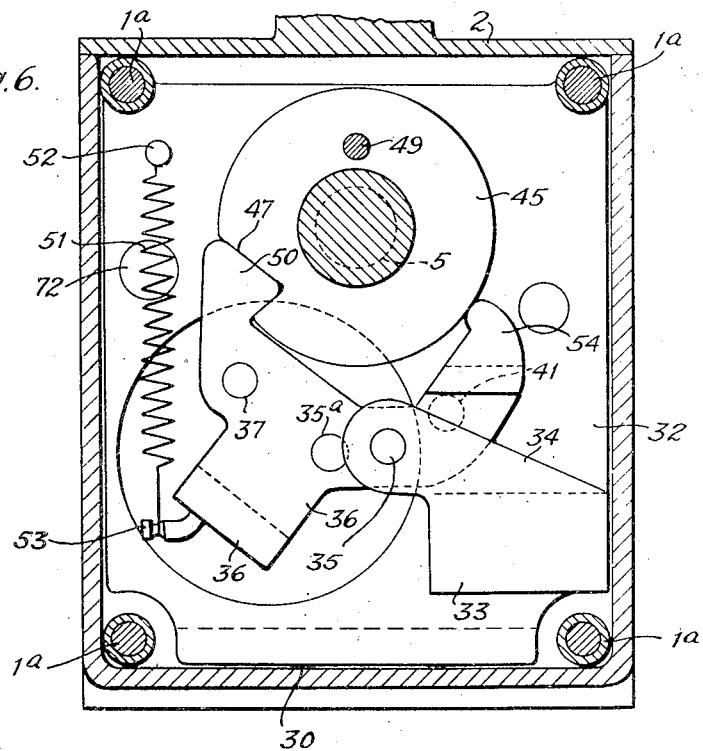
Figure 6 is a section on line 6—6 of Fig. 1.
Figure 7 is a section on line 7—7 of Fig. 1.

Referring to the drawings, I indicates a casing or support for the counter mechanism, said support having end members suitably connected by tie rods 1a, Figures 2 and 3. The casing is provided with a hinged top 2, which top may be secured to the casing by a lock 3, Figure 4, of any suitable kind. Bosses 4 and 7, which may be integral with the casing, support the ends of a shaft 5 upon which shaft the counting wheels and predetermined count wheels are mounted. A knurled knob 8 is secured to the left-hand end of the shaft by which it may be manipulated for zero-setting purposes.

While the present invention relates to the predetermined count mechanism, nevertheless it will be necessary for an understanding of the complete operation of this mechanism to describe the general construction of the counter.

The present counter is illustrated as having three denominational groups or assemblies of elements but the number, of course, is not restricted to that shown. For convenience in assembling, the denominational groups of elements are separately supported upon sleeves 9. The sleeves 9, one of which is shown in Figure 9, each have a keyway 10 extending along their entire length and a longitudinal slot 11 diametrically opposite the keyway 10 but extending only part way along their length.

Referring to Figures 1 and 11, the driving mechanism for the counter consists of a sleeve 60 which projects beyond the boss 4 and to which is attached an operating element 61. The sleeve 60 is provided with a collar 62 which abuts a circular shoulder formed within the boss 4. To the left of the shoulder the sleeve is formed with a slot 63, and a separate element 64 is provided having the flattened portion 65 for loosely and slidingly engaging the slot 63. A coiled spring 66 is interposed between the shoulder 62 and element 64 which normally holds the element 64 with its clutch face 67 in engagement with the clutch member r of the units counting wheel. The right hand end of the element 64 has a reduced portion 68 into which a bolt 69 is threaded, the length of the bolt being such as to permit the necesary longitudinal movement between element 64 and the sleeve 60. This construction provides longitudinal movement of the element 64 in respect of the sleeve 60 for the purpose of permitting engagement and disengagement of the clutch face 67 of the element 64 with the clutch member r of the units driving gear q for driving said gear as is usual in counting mechanisms. It will be noted that the end of shaft 5 abuts a circular shoulder on the interior of element 64 whereby the latter is moved longitudinally to the right with the shaft 5 to disengage the clutch face 67 from clutch member r, thus permitting the counting mechanism to be disengaged from its driving mechanism and reset by rotating the shaft 5, as will be hereinafter described. The clutch member r is secured to the right hand end of the sleeve 9 of the units assembly and the wheel q to the left thereof is provided with a key 12, Figure 8, for engagement with the keyway 10 of said sleeve 9 so that said wheel q and the sleeve turn with the clutch member r when the latter is driven.

Adjacent the wheel q and to the left thereof are the three elements c, b and a, constituting a portion of the predetermined count mechanism. These three wheels are secured to a sleeve 13, Figure 8, and move as a unit but are supported for rotation upon a sleeve 13a, Figure 10, which sleeve is secured to the sleeve 9 immediately adjacent the wheel q. The wheel c is a gear wheel of the same size and having the same number of teeth of the same pitch as the teeth of the wheel q. The wheel b is a numbered wheel having radial projections 14 whereby it may be manipulated by hand or by a small tool to set each predetermined count wheel for different predetermined counts. The element a of the predetermined count mechanism is a disc having a single notch 15, Figure 3, in its periphery. Adjacent the disk a is the disk p provided with a key 19 disposed in the slot 11 of sleeve 9. To the left of disk p (Figure 8) is the reset pawl carrier o provided with a key 20 for engaging keyway 10 and also having a chamber 21 in which a reflexed spring 22 is housed. The spring 22 acts upon a dog, or pawl, 23 which is guided for radial movement and enters the slot 11 of sleeve 9. This pawl has shoulders which extend slightly beyond the width of slot 11 and when the pawl is in the position shown in Figure 8, the pawl extends through the slot 11 and beyond the inner cylindrical surface of the sleeve 9 for engagement with a longitudinal resetting slot in shaft 5. Adjacent the reset pawl carrier o and to the left thereof as viewed in Figure 8 is the units numeral wheel n of the counter, which wheel is provided with a flanged rim upon which the numerals 0 to 9 are suitably inscribed. This flanged rim extends to the right and embraces within it the reset pawl carrier o and the disc p, as shown in Figure 1. The numeral wheel n has a key 24 which enters the slot 11 of sleeve 9, it being noted that when the parts are assembled the key 24 and the key 19 of disc p prevent displacement of the reset pawl 23 and guide the same in its radial movement. The disc m is a locking disc and l is a tens transfer disc, and both these discs are associated with the transfer mechanism of the counter. The disc m is provided with a key 25 and the disc l with a similar key 27 for engagement with the keyway 10 of the sleeve 9 and both are driven when the sleeve 9 is turned. Thus, it will be noted that the elements l, m, n, o, p and the gear q move together. At this point, however, it may be stated that, as later described, the elements a, b and c of the predetermined count mechanism also move with the counting wheel elements in the normal operation of the counter but the predetermined count wheels may be moved independently of the counting wheel elements to enable the predetermined count elements to be individually set. The tens transfer disc l operates in connection with the transfer pinions 38, Figures 1 and 3, to transfer to higher orders in a well known manner. The tens assembly is precisely like the units assembly already described except that no clutch r is necessary. The hundreds assembly is also similar to the units assembly except that it omits the clutch elements r and also omits the discs l and m since there is no carrying to a higher order, a washer 29, Figure 1, taking the place of these two discs.

The transfer mechanism is of the usual type found in lock counters and is of the intermediate pinion variety. As shown in Figure 5, each of the transfer pinions 38 is provided with a series of alternate long and short teeth. Normally two adjacent long teeth engage the periphery of the locking disc m while the intermediate short tooth engages the transfer gear q of the counter unit of next higher order. When a wheel of lower order passes from 0 to 9 the notch in the locking disc m permits a long tooth to enter it and at the same time the transfer teeth 28 of the transfer disc l engage the teeth of the pinion 38 and move it to such an extent that the wheel of the next higher order is moved one digit place, as is well known in the art.

As described in the parent application Serial No. 378,831, novel means are provided for maintaining the transfer pinions 38 in proper angular relation while they are out of mesh with the transfer gears and locking discs during zero setting operations. As part of these aligning devices are associated with the predetermined count mechanism it will be necessary to describe somewhat in detail this aligning mechanism.

The transfer pinions 38 are supported on an inner frame consisting of a lower member 30 and upright members 31 and 32, Figures 1 and 4. Projecting to the left of the upright 32 is a bracket 33, the upright portion 34 of which is provided with a stud 35 for supporting a yoke 36, Figures 2 and 3. The opposite end of the yoke is supported pivotally in the upright 31. Pivotally mounted in the yoke are shafts 35a and 37, the pinions 38 being carried on the latter shaft. The shaft 35a is provided with a series of idle pinions 40, Figure 3, one for each transfer pinion and with one of which each transfer pinion is constantly in mesh. Also supported in the frame members 31 and 32 is a shaft 41 having gears 42, 43 and 44 supported for independent rotation thereon as shown in Figures 2, 3 and 4 and held in proper lateral position by spacing sleeves, the end sleeve being pinned to the shaft. The wheel 42 at the extreme right does not have a pinion 38 and a wheel 40 since it is associated with the driving unit of the counter but said wheel 42 serves the purpose of aligning the gear q of the units counting wheel assembly and the wheel c of the units predetermined count assembly. The wheels 43 and 44 perform a similar function but in addition they perform the function of keeping the transfer pinions in proper angular relation with the gears q of the tens and hundreds assemblies. By reference to Figures 2 and 3 and from a comparison of Figures 4 and 5 it will be understood that the transfer pinion between the units and tens counting wheel assemblies normally engages directly with the wheel q of the tens assembly and through gear train 40 and 43 there is a second indirect engagement with the same gear q. As an additional safeguard against displacement of the wheels during resetting, a series of spring fingers 84 are secured to yoke 36 (Figure 3) having curved ends frictionally engaging the hubs 85 of gears 42, 43 and 44.

This aligning mechanism for the transfer pinions, however, is utilized in connection with the predetermined count mechanism and insures the reliability of action of said mechanism even with the high speeds of counter operations frequently desired.

The shaft 5 carries a collar 45 having a circular opening 46 at its left hand side and a peripheral notch 47 (Figure 6). A spring 48 is coiled about the shaft 5 between the upright 32 and the collar 45 and acts to hold the shaft 5 and the collar in the position shown in Figure 1 in which the collar abuts the boss 7. The shaft is capable of sufficient longitudinal movement to withdraw a pin 49 projecting from the boss 7 from the opening 46, thus permitting the shaft to be rotated, such longitudinal movement of the shaft 5, it will be recalled, being effective to move the driving element 64 to disengage its clutch face 67 from the clutch member $r$ of the lowest order counting unit.

The left hand end of the yoke 36 is formed with members resembling escapement dogs, the left dog 50 (Figure 6) normally occupying the notch 47 in collar 45. The yoke is held in its normal position with dog 50 in notch 47 by a spring 51 connected at its upper end to a pin 52 on upright 32 and at its lower end to a projection 53 on the yoke 36. The right hand dog 54 normally rests upon the periphery of the collar 45, thus locking the yoke against rocking movement. The locking dog 54 is laterally offset relative to the dog 50 (Figure 4) so that when the shaft and collar 45 are moved to the right, as viewed in this figure, the collar is moved beyond the locking dog 54. When the shaft 5 is turned counter-clockwise (Figure 6) the edge of notch 47 acts against the face of the dog 50 and rocks the yoke against the bias of its spring 51, the locking dog being thereby moved to a position behind the collar 45, preventing the return of the shaft 5 to its normal position under the action of spring 48 until the collar 45 has made a complete revolution and the pin 49 and opening 46 again register. The dog 50 will then drop into the notch 47 and the locking dog will permit the shaft to return to its normal position.

The shaft 5 has three annular grooves, one for each zero resetting pawl 23. The bottom of these grooves is at a level with the bottom of a longitudinal resetting groove in the shaft which extends from its right hand end to a point beyond the pawl 23 of the counting unit of highest order. These pawls, it will be remembered, are normally supported by their shoulders against the edges of the slot 11 in sleeves 9 (Figure 8) with their extremities out of contact with the bottoms of the grooves so that during counting there is no frictional resistance between the shaft 5 and the resetting pawls 23. When the shaft 5 is moved longitudinally to reset the counting units, the resetting pawls move into the longitudinal resetting slot, or if the slot is not angularly aligned with any pawl, the latter is cammed upwardly against the action of its spring 22 by the beveled edge 55 of the annular groove acting on the beveled edge 60 of the pawl (Figure 1). A pawl moved in this manner will then rest on the shaft until it is picked up by the longitudinal slot. By a complete revolution of the resetting shaft, all the counter units will be returned to their initial position in which the counting number wheels $n$ of the several units will all read zero and the predetermined count will appear on the predetermining wheels $b$ of the several predetermining units.

As previously described, the wheels $a$, $b$ and $c$ of each predetermined count assembly are secured together so as to rotate as a unit upon the sleeve 13a, which sleeve is fast upon the sleeve 9. All three of the wheels of the predetermined count mechanism have diametrically opposite holes 16 placed in alignment for the reception of springs 17, Figure 1, which act upon detents in the form of balls 18 to hold the predetermined count wheels in definite position when manipulated by hand or otherwise. The gear wheel $q$ has a series of ten depressions equally spaced near its periphery, and corresponding in position to the numerals on the number wheels with which these balls engage. The balls on the other side engage similar depressions in the disc $p$ as shown in Figure 1. By means of the spring pressed balls 18, therefore, the predetermined count assembly may be held in different positions to which it may be adjusted. As indicated in Figure 5, the numbers on the predetermined count wheel $b$ run in the opposite direction from the numbers on the counting wheel rim $n$. The wheel $c$ is an aligning wheel and also serves the function of assuring that during the driving and resetting of the counter wheel the predetermined count assembly moves in exact accordance therewith.

Referring to Figure 4, the wheel 42 is wide enough to normally engage the gear $q$ of the units assembly and the gear $c$ of the predetermined count assembly in the units order. It will also be recalled that the clutch member $r$ is fast to the sleeve 9 and that the gear $q$ is keyed to said sleeve. Therefore $q$ always partakes of the rotations of the driving mechanism through the clutch $r$ and this movement of the wheel $q$ is therefore transmitted to the wheel $c$, and since $a$, $b$ and $c$ are connected to move as a unit, the predetermined count assembly will necessarily move with the count wheel assembly of like order.

The disc $a$ of the predetermined count assembly is provided with a notch 15, as already described, and as shown in Figure 3, and when all of the notches of the several predetermined count assemblies are in alignment they permit the ends 70 of a series of pawl fingers 71 to enter into said notches. The fingers 71 are all rigidly connected together and pivot on the shaft 72. Before the notches 15 are aligned the ends 70 rest on the periphery of each disc $a$ and the lower end 73 of the pawl frame occupies the position shown in Figure 2. When, however, the pawls drop into the notches the pawl frame moves from the position shown in Figure 2, being urged to this position by a spring 74 acting on the shaft 72. The lower end 73 of one pawl finger engages a member 75 which may operate an electric switch to ring a bell, light a light, or give any signal desired, or it may be arranged to control mechanism to stop a machine in any of the well-known ways.

Since in the normal position of the counter none of the wheels can be moved except through the wheel of units order, the higher wheels being locked through the locking discs $m$ and transfer pinions, it follows that the predetermined count assemblies are likewise locked from movement through the gear wheels 42, 43 and 44, each of which engages a gear $q$ as well as a gear $c$. Therefore, means are provided to shift the wheels 42, 43 and 44 laterally so that they are disengaged from the wheels $c$ of each order thereby permitting the predetermined count assembly in any order to be independently adjusted. It will be noted also by reference to Figure 4 that the wheels 42, 43 and 44 maintain their engagement with the idle pinions 40 even when displaced laterally, the latter being sufficiently wide-faced for this purpose. The shaft 41 is bodily displaceable and for this purpose it has a limited sliding movement in the members 31 and 32, Figure 4. A member 80 (Figure 4) is slidable on a shaft 81, and its lower portion is provided with fingers which embrace the idle pinion 44 and through it move the shaft 41 to the right. The knob 82, Figure 5, is provided for manipulating the member 80. The upper end 83 of the member 80 (Figure 7) is adapted to engage a slot in the cover 2 of the casing, which slot is of such shape and size as to prevent lateral movement of the member 80 when the cover of the casing is closed, see Figures 4 and 5. This, together with the lock 3, enables the predetermined count mechanism to be changed only by the person authorized to do so.

As a result of my improved construction, it will be noted that the predetermining number wheels b and the denominational counting wheels n are positively locked against relative angular movement both during counting and during resetting, by reason of the engagement of the gear wheels 42, 43, 44 with adjacent gears c and q of the several counter units. This direct geared connection permits the counter to be operated at high speed. It will also be evident that, by actuation of the common operating member 82 (Figures 5 and 7), the gear wheels 42, 43, 44 will be caused to disengage the gear wheel c of the predetermined units, simultaneously releasing the predetermined counter wheels of all the units for adjustment in either direction. Attention is further directed to the fact that this adjustment is possible irrespective of whether or not the transfer pinions 40 are in mesh with the transfer gears of the several counter units. Further it will be noted that a longitudinally compact counter is provided, the usual wide spacing between the elements of the several counter units not being required, since the means permitting relative adjustment between the predetermined and denominational counter wheels is wholly external of the peripheries of the counting wheels. These and other advantages of my improved construction will be apparent to those skilled in the art.

While I have in this application specifically described one embodiment which my invention may assume in practice, it will be understood that the same is shown for purposes of illustration, and that the invention may be modified and embodied in various other forms without departing from its spirit or the scope of the appended claims.

What is claimed is:—

1. The combination with a counter having a plurality of counting mechanisms each having a counting wheel, and carrying mechanism between adjacent mechanisms, of predetermining mechanism operative after a predetermined count having on each counting mechanism a predetermining number wheel adjustable relative to said counting wheel and the parts of said carrying mechanism on said counting mechanism to set up a predetermined count on said predetermining wheels, and resetting mechanism for resetting said predetermining wheels having means for maintaining the predetermined angular relation of the predetermining wheels of each counting mechanism relative to the carrying mechanism between adjacent counting mechanisms during resetting while maintaining the elements of said carrying mechanism in transverse alignment.

2. The combination with a counter having a plurality of resettable counting mechanisms each having a counting wheel, and carrying mechanism therebetween, of predetermining mechanism operative after a predetermined count having on each counting mechanism a predetermining member disposed between parts of said carrying mechanism thereon and adjustable relative thereto to set up a selected predetermined count, resetting mechanism including a resetting shaft extending through said counting mechanisms and rotatable to reset said predetermining members to said predetermined count and having means for maintaining a fixed angular relation of the predetermining member on each counting mechanism and the carrying mechanism between adjacent mechanisms, and means providing a releasable connection between each predetermining member and a part of said carrying mechanism for permitting the aforesaid adjustment of said predetermining member to change the predetermined count.

3. The combination with a counter having a plurality of counting mechanisms, each having a rotatable counting wheel, carrying members on opposite ends thereof, and a resetting member rotatable therewith, of predetermining mechanism operative after a predetermined count having on each mechanism an adjustable predetermining number wheel adjustable relative to both of said carrying members on its mechanism to set up a predetermined count, and resetting mechanism for said counting and predetermining wheels including a rotatable resetting shaft having means cooperating with the resetting members of said counting mechanisms to reset said counting mechanisms and having provision for returning said predetermining wheels, following completion of the predetermined count, to a reset position in which said predetermined count is again set up on said predetermining wheels.

4. A counter having a plurality of counting mechanisms each including transfer elements thereon, a counting number wheel, and a predetermining number wheel adjustable relative to all of said elements and said counting number wheel to set up any predetermined number and having the numbers thereof progressing in the opposite direction from the numbers on said counting number wheel, cooperating transfer mechanism meshing with said transfer elements on adjacent mechanisms during adjustment of said predetermining number wheels, cooperating predetermining mechanism cooperating with said predetermining number wheels, and resetting mechanism for resetting both sets of said number wheels in one operation, including a rotatable resetting shaft having means for aligning the zeros of said counting wheels and aligning said predetermining wheels with the predetermined count set up thereon and returning said aligned wheels to reset position.

5. A counter having a plurality of counting mechanisms each including transfer elements thereon, a counting number wheel, and a predetermining number wheel having numbers thereon increasing in a direction opposite to the direction of increase of those on said counting number wheel, means for resetting both sets of number wheels in one operation, including a rotatable resetting shaft having means for aligning the zeros on said counting wheels and aligning said predetermining wheels with the predetermined count set up thereon and returning said aligned wheels to reset position, and cooperating predetermining mechanism cooperating with said predetermining number wheels, said number wheels adding during operation, and said predetermining number wheels returning to zero during operation.

6. A counter having a plurality of counting mechanisms each including transfer elements thereon, a counting number wheel, and a predetermining number wheel, a releasable clutch connecting each predetermining wheel with its counting mechanism whereby said predetermining wheels can be adjusted to set up thereon a direct reading number equal to the desired count, resetting mechanism for said counting mechanisms including a resetting shaft extending through said mechanisms and rotatable to reset the latter, and cooperating predetermining mechanism cooperating with said predetermining number wheels, said counting number wheels adding during operation, and said predetermining number wheels returning to zero during operation and one set of wheels operating uniformly while the other does not.

7. In a predetermining counter, a plurality of counting mechanisms each having a counting number wheel and a predetermining number wheel adjustable relative to the counting number wheel of its respective mechanism, means normally restraining said predetermining number wheels against such relative adjustment, and operating means common to all of said mechanisms for simultaneously releasing the predetermining number wheels of all the mechanisms for adjustment.

8. In a predetermining counter, a plurality of counting mechanisms, each including a driving gear and predetermining count mechanism adjustable relative to said gear and including a like gear adjacent said driving gear, an interlocking gear normally meshing with said adjacent gears movable to disengage one of the same for permitting adjustment of said predetermining mechanism, and common operating means for the interlocking gears of the several counting mechanisms simultaneously releasing the predetermining mechanism of all the counting mechanisms for adjustment.

9. A predetermining counter having a casing provided with a cover, a plurality of counting mechanisms each including a counting number wheel and a predetermining number wheel adjustable relative to the counting number wheel of its respective mechanism, means located radially externally of said predetermining number wheels normally connecting the counting and predetermining wheels of each counting mechanism for rotation in unison during counting, mechanism cooperating with said connecting means for releasing said predetermining wheels for adjustment, and manually adjustable means governed by the position of said cover and controlling said releasing mechanism.

10. A predetermining counter including a plurality of operatively connected counting mechanisms, each of said mechanisms having a counting wheel, a predetermining wheel, and means normally causing said predetermining and counting wheels to rotate in unison during counting, while permitting adjustment of said predetermining wheels into different angular positions relative to their respective mechanisms to vary the predetermined count, including releasable connecting elements operable from outside the radial peripheral limits of their associated counting wheels and connecting said predetermining wheels to their respective counting mechanisms, and cooperating predetermining mechanism cooperating with said predetermining wheels in any adjusted position thereof and operative after a predetermined count.

11. A predetermining counter having a plurality of counting mechanisms including carrying mechanism therebetween, each of said mechanisms having a counting wheel, a predetermining wheel, and means normally causing said predetermining and counting wheels to rotate in unison during counting, while permitting adjustment of said predetermining wheels into different angular positions relative to their respective mechanisms to vary the predetermined count, including releasable connecting elements connecting each predetermining wheel to its respective counting mechanism, the several elements of each of said counting mechanisms being axially disposed to form substantially peripherally closed generally cylindrical mechanisms and the releasable connecting elements of said predetermining wheels being operable from outside the radial peripheral limits of said counting mechanisms, and cooperating predetermining mechanism cooperating with said predetermining wheels in any adjusted position thereof and operative after a predetermined count.

12. A predetermining counter including a plurality of operatively connected counting mechanisms, each of said mechanisms having a counting wheel, a predetermining wheel, and means within the circumferential limits of said predetermining wheel releasable from the periphery of said counting mechanisms and operative by grasping the rim of said predetermining wheel and rotating the latter for freeing said wheels for adjustment into different angular positions relative to their respective mechanisms, and cooperating predetermining mechanism cooperating with said predetermining wheels in any adjusted position thereof and operative after a predetermined count.

13. A predetermining counter including an axial shaft, a plurality of axially aligned operatively connected counting mechanisms on said shaft, each of said mechanisms having a counting wheel, a predetermining wheel, and a releasable clutch between each predetermining wheel and its counting mechanism including connecting elements operable by a rotative movement only of said predetermining wheels for releasing the latter for adjustment into different angularly related positions to vary the predetermined count, and predetermining mechanism cooperating with said predetermining wheels in various adjusted positions thereof and operative following completion of a predetermined count.

14. A predetermining counter having a plurality of operatively connected counting mechanisms, each of said mechanisms having a counting wheel, a predetermining wheel, and releasable interlocking means normally connecting said predetermining and counting wheels for conjoint rotation while permitting adjustment of said predetermining wheels relative to their respective counting mechanisms to vary the predetermined count set up, said interlocking means comprising interlocking members releasable by a rotative movement only of said predetermining wheel, and said predetermining wheel having a peripheral rim adapted to be grasped to rotate the latter manually to release said interlocking members.

15. A counter having denominational order counting wheels, predetermined count mechanism including a series of individually adjustable number wheels, each number wheel situated adjacent a counting wheel of like denominational order, means for normally causing the predetermined count wheels and the counting wheels to move together, and means operative from the peripheries of said wheels radially externally thereof for freeing the predetermined count wheels from the counting wheels for individual adjustment.

16. A counter having denominational order counting wheels, predetermined count mechanism including a series of individually adjustable number wheels, each number wheel situated adjacent a counting wheel of like denominational order and having a peripheral portion extending radially therebeyond, means for normally locking the predetermined count wheels to the counting wheels, and means operative from the peripheries of said wheels radially externally thereof for releasing the predetermined count wheels for individual adjustment.

17. A counter having denominational order counting wheels, each wheel having a numbered rim and a gear associated therewith, a series of predetermined count wheels, each having a numbered rim and a gear attached thereto, means normally engaging both gears whereby they are moved together, and means whereby a predetermined count gear is released from the counting wheel gear to enable the predetermined count wheel to be individually set.

18. A counter having denominational order counting wheels, predetermined count mechanism including a series of number wheels associated respectively with the counting wheels and individually adjustable relative thereto, and means external of the peripheries of said counting number wheels in a radial direction releasably connecting the same, a casing for housing said counting wheels and predetermined count mechanism, said casing having a cover, and means associated with said cover for preventing release of said connection for individual adjustment of said predetermined count wheels when said cover is in a predetermined position.

19. A counter having denominational order counting wheels, gear wheels associated therewith, predetermined count mechanism including a series of connected individually adjustable gear wheels and number wheels associated respectively with the counting wheels, means releasably connecting the gears of associated counting and number wheels, a casing for housing said counting wheels and predetermined count mechanism, said casing having a cover, and means for preventing release of said connected gears for individual adjustment of said predetermined count wheels when said cover is in closed position.

20. A counter having denominational order wheels, each wheel having a numbered rim and a gear associated therewith, a series of predetermined count wheels, each having a numbered rim and a gear wheel attached thereto, the predetermined count wheel and its gear being situated between the gear and numbered rim on each counting wheel, a shaft parallel to the axis of the counting wheels and a series of pinions on said shaft each normally engaging a gear of a predetermined count wheel and a counting wheel gear so that the two gears normally move together.

21. A counter having denominational order wheels, each wheel having a numbered rim and a gear associated therewith, a series of predetermined count wheels, each having a numbered rim and a gear wheel attached thereto, the predetermined count wheel and its gear being situated between the gear and numbered rim of each counting wheel, a shaft parallel to the axis of the counting wheels and a series of pinions on said shaft each normally engaging a gear of a predetermined count wheel and a counting wheel gear so that the two gears normally move together, and means for moving said series of pinions longitudinally to disengage each pinion from its associated predetermined count wheel gear to permit said count wheels to be independently adjusted.

22. A series of counting wheels, each wheel except that of highest order having a numeral rim, a locking disk and a gear, the wheel of highest order having only a numeral rim and gear, a mutilated transfer pinion between adjacent wheels of higher and lower order, said transfer pinion directly engaging the gear of each higher order wheel, a series of predetermined count wheels each having a numeral disc and a gear wheel, said latter wheel being adjacent the gear wheel of the counting wheel of like denominational order, and a gear normally engaging the adjacent gears of both the predetermined count wheels and the counting wheels interlocking the same during counting.

23. A series of counting wheels, each wheel except that of highest order having a numeral rim, a locking disc and a gear, the wheel of highest order having only a numeral rim and gear, a mutilated transfer pinion between adjacent wheels of higher and lower order, said transfer pinion directly engaging the gear of each higher order wheel, a series of predetermined count wheels each having a numeral disc and a gear wheel, said gear wheel being adjacent the gear wheel of the counting wheel of like denominational order, a gear normally interlocking the gears of both the predetermined count wheels and the counting wheels, and means for shifting said interlocking gear to permit individual setting of said predetermined count wheels.

24. Predetermining counting mechanism including a rotatable axial member, a driving gear fixed to said member for rotation therewith having spaced depressions in its side wall, a predetermining number wheel mounted on said member for relative rotation having numbers arranged about its periphery, a detent passage in said number wheel having its axis parallel with the axis of said axial member, and an axially yieldable spring pressed detent located in said passage coacting with the depressions in said driving gear to permit step by step rotation of said number wheel in either direction relative to said gear.

25. Predetermining counting mechanism including a rotatable axial member, spaced discs fixed to said member for rotation therewith, one of said discs constituting a driving element, and said discs having their proximate faces provided with aligned depressions therein, a predetermining mechanism mounted on said axial member for relative rotation including a number wheel having numbers arranged about its periphery in positions corresponding to said depressions, a transverse detent passage in said number wheel having its axis parallel with the axis of said axial member and in alignment with said depressions, and spring pressed detents located in said passage and coacting with the depressions in both of said discs to permit step by step rotation of said number wheel in either direction relative to said axial member.

26. Predetermining counting mechanism including a rotatable axial member, a driving gear fixed to one end of said member for rotation therewith, an abutment plate fixed to the opposite end of said member for rotation therewith, the proximate faces of said gear and plate having corresponding depressions therein, a predetermining mechanism mounted on said axial member between said gear and plate for relative rotation having an aligning gear corresponding to said driving gear adjacent the latter and a number wheel located adjacent said plate, a passage in said predetermining unit having its axis parallel with the axis of said axial member and aligned with the depressions in said gear and plate, spring pressed detent means located in said passage and coacting with said depressions to permit step by step rotation of said number wheel in either direction relative to said gear and plate, and means normally locking said predetermining unit to said driving gear for conjoint rotation including a locking pinion normally meshing with both said driving and aligning gears and shiftable to disengage the latter.

EDWARD A. SLYE.